(12) United States Patent
Erdler et al.

(10) Patent No.: US 10,571,317 B2
(45) Date of Patent: Feb. 25, 2020

(54) FLOW MEASUREMENT ARRANGEMENT INCLUDING A FLOW TUBE AND AN ELASTICALLY DEFORMABLE ORIFICE PLATE WITH STRAIN SENSORS

(71) Applicant: Siemens Aktiengesellschaft, Munich (DE)

(72) Inventors: Gilbert Alexander Erdler, Ettlingen (DE); Stefan Von Dosky, Karlsruhe (DE); Wolfgang Ens, Linkenheim (DE)

(73) Assignee: Siemens Aktiengesellschaft, Munich (DE)

( * ) Notice: Subject to any disclaimer, the term of this patent is extended or adjusted under 35 U.S.C. 154(b) by 54 days.

(21) Appl. No.: 15/901,033

(22) Filed: Feb. 21, 2018

(65) Prior Publication Data

US 2018/0238722 A1 Aug. 23, 2018

(30) Foreign Application Priority Data

Feb. 22, 2017 (DE) .................. 10 2017 202 896

(51) Int. Cl.
*G01F 1/38* (2006.01)
*G01F 1/42* (2006.01)

(52) U.S. Cl.
CPC ............. *G01F 1/383* (2013.01); *G01F 1/38* (2013.01); *G01F 1/42* (2013.01)

(58) Field of Classification Search
None
See application file for complete search history.

(56) References Cited

U.S. PATENT DOCUMENTS

| 4,249,164 | A | * | 2/1981 | Tivy | ......................... | G01F 1/42 |
| | | | | | | 73/861.42 |
| 5,780,748 | A | * | 7/1998 | Barth | ....................... | F15C 5/00 |
| | | | | | | 73/861.47 |

(Continued)

FOREIGN PATENT DOCUMENTS

| DE | 1943021 | 3/1970 |
| DE | 102015216624 | 3/2017 |

(Continued)

OTHER PUBLICATIONS

Norm Din EN ISO 5167-1 2004-01-00. "Durchflussmessung von fluiden mit Drosselgeraeten in voll durchstroemten Leitungen mit Kreisquerschnitt—Part 1: Allgemeine Grundlagen and Anforderungen", (ISO 5167-1:2003), German Edition EN ISO 5167-1:2Q03. p. 1-41.; 2004.

*Primary Examiner* — Harshad R Patel
(74) *Attorney, Agent, or Firm* — Cozen O'Connor

(57) ABSTRACT

A flow measurement arrangement and measuring transmitter for process instrumentation that includes the flow measurement arrangement, wherein the flow measurement arrangement operating in accordance with the differential-pressure method includes a tube and an elastically deformable measuring diaphragm (orifice plate) arranged in the cross section of the tube and a strain sensor that detects the deformation and converts it into an electric signal, where the measuring diaphragm (orifice plate) and the tube are formed in one piece from uniform material, and where both side of the measuring diaphragm (orifice plate) each pass into the tube via a fillet groove and the at least one strain sensor is arranged on the circumferential side of the tube opposite the fillet groove.

8 Claims, 3 Drawing Sheets

(56) References Cited

U.S. PATENT DOCUMENTS

| | | | | |
|---|---|---|---|---|
| 6,253,605 B1* | 7/2001 | Richter | .................. | G01F 1/363 |
| | | | | 73/861.58 |
| 2003/0136196 A1* | 7/2003 | Wiklund | ............. | F15B 15/2838 |
| | | | | 73/716 |
| 2003/0172742 A1 | 9/2003 | Brookshire et al. | | |
| 2007/0113662 A1* | 5/2007 | Greenwood | .......... | G01L 9/0019 |
| | | | | 73/716 |
| 2009/0308167 A1* | 12/2009 | Motoyama | ............ | G01L 9/0008 |
| | | | | 73/717 |
| 2011/0167918 A1* | 7/2011 | Dukart | .................. | G01L 9/0064 |
| | | | | 73/720 |
| 2015/0362391 A1* | 12/2015 | Suzuki | ................. | G01L 9/0044 |
| | | | | 137/511 |
| 2018/0245999 A1* | 8/2018 | Erdler | .................... | G01L 9/0064 |
| 2018/0252605 A1* | 9/2018 | Klehr | .................. | G01L 19/0023 |

FOREIGN PATENT DOCUMENTS

| | | |
|---|---|---|
| DE | 102015216626 | 3/2017 |
| WO | WO2009156209 | 12/2009 |

* cited by examiner

FLOW MEASUREMENT ARRANGEMENT INCLUDING A FLOW TUBE AND AN ELASTICALLY DEFORMABLE ORIFICE PLATE WITH STRAIN SENSORS

BACKGROUND OF THE INVENTION

1. Field of the Invention

The invention relates to a through-flow measurement arrangement operating in accordance with the differential-pressure method and including a tube and an elastically deformable measuring diaphragm (orifice plate) is arranged in the cross section of the tube and a strain sensor that detects the deformation of the diaphragm (orifice plate) and converts the deformation into an electric signal, and also relates to a measuring transmitter for process instrumentation having such a through-flow measurement arrangement.

2. Description of the Related Art

DE 1 943 021 A discloses a conventional through-flow measurement arrangement.

In the case of through-flow measurement in accordance with the differential pressure method, the cross section of tubing is constricted at one point by the insertion of a restrictor (e.g. diaphragm, nozzle, Venturi tube). The constriction causes the rate of flow to increase with the same volume through-flow. The pressure energy converted into kinetic energy causes a pressure drop over the restrictor, which is measured as differential pressure (effective pressure) upstream and downstream from the restrictor. The functional relationship between the differential pressure and the through-flow is known (e.g.: ISO 5167). As a result, this enables the through-flow to be determined.

With the through-flow measurement arrangement disclosed in DE 1 943 021 A, strain sensors (strain gages) are arranged on the measuring diaphragm to convert deformation of the measuring diaphragm or parts thereof dependent upon the differential pressure into an electric signal. The measuring diaphragm is elastically deformable either over its entire cross section or in its edge region, wherein, in the latter case, the measuring diaphragm consists of an internal rigid perforated disk and one or two outer ring-shaped diaphragms. The two outer ring-shaped diaphragms form between them a slit-shaped space open toward the outer side of the tube in which the strain sensors can be attached to the diaphragms while protected from the medium flowing in the tube. Alternatively, the strain sensors could be attached to a bending bar connected in a non-positive way to the perforated disk at one end and to the tube wall at the other end.

With the conventional through-flow measurement arrangement, the tube consists of two sections between which the measuring diaphragm is installed. In the embodiment mentioned in the form of the internal rigid perforated disk with the two outer ring-shaped diaphragms, the actual measuring diaphragm consists of a plurality of parts that have to be connected to one another and to the tube sections. The location for installing the strain sensors on the diaphragms is in the region between the inside diameter of the tube and the outside diameter of the rigid perforated disk and hence, viewed from the outer side of the tube, very deep within the slit-shaped space formed by the diaphragms. Therefore, it is difficult to accommodate the strain sensors in the through-flow measurement arrangement only toward the end of the through-flow measurement arrangement assembly. On the other hand, if the strain sensors are attached to the diaphragms in advance, they could be damaged when the diaphragms are later connected to the other parts of the through-flow measurement arrangement, such as welded thereto.

US 2003/0172742 A1 discloses a through-flow measurement arrangement that also operates in accordance with the differential pressure method. The measuring diaphragm and the tube are formed in one piece from a uniform material. The through-flow is determined from the difference between two pressures measured by two pressure sensors upstream and downstream from the measuring diaphragm.

WO 2009/156209 A1 discloses a pressure sensor arrangement with a tube and a partition diaphragm arranged therein, which are manufactured in one piece from a uniform material. On its circumferential side opposite the partition diaphragm, the tube has a recess in the region of which the tube wall, with its reduced thickness, serves as a side-wall diaphragm. A pressure difference applied to the partition diaphragm results in the deformation thereof. The partition diaphragm meets the side-wall diaphragm in a T-shape, due to the high rigidity. As a result, no deformation occurs there and so the deformation of the partition diaphragm is transmitted to the side-wall diaphragm and is detected with strain sensors arranged there in the recess. The known pressure sensor arrangement is provided to be used during the monitoring of diesel particulate filters to measure the exhaust gas pressure upstream and downstream from the particle filter and thus ascertain the state of its loading.

A pressure sensor arrangement is also the subject matter of the later-published patent applications DE 10 2015 216 624 A1 and DE 10 2015 216 626 A1.

SUMMARY OF THE INVENTION

It is an object of the invention to provide a through-flow measurement arrangement having a simple structural design and that is simultaneously suitable for use in a measuring transmitter for process instrumentation.

This and other objects and advantages are achieved in accordance with the invention by a through-flow measurement arrangement in which the measuring diaphragm and the tube are formed in one piece from a uniform material, where both sides of the measuring diaphragm each pass into the tube via a fillet groove and where the at least one strain sensor is arranged on the circumferential side of the tube of the fillet groove.

The one-piece embodiment of the measuring diaphragm and tube enables the through-flow measurement arrangement in accordance with the invention to be produced reproducibly in a much simpler way and with higher precision than is possible with the conventional through-flow measurement arrangement disclosed in DE 1 943 021 A. The fillet groove in the region connecting the tube and measuring diaphragm creates a bending joint directly where the measuring diaphragm meets the tube in a rectangular shape or T-shape. At this point, the material deformation is greatest on the deflection of the measuring diaphragm so that the strain sensor arranged on the circumferential side of the tube opposite the fillet groove supplies a maximum signal. The local single bending on the bending joint is greater than would be the case with spatially extending multiple bending of the tube wall if the deformation of the measuring diaphragm were transmitted to the tube wall in a positive and non-positive manner. Finally, with the through-flow measurement arrangement in accordance with the invention, the strain sensor is arranged on the circumferential side of the tube in a manner that is easily accessible and simple to install and contact.

Preferably, the at least one strain sensor is arranged in a recess on the circumferential side of the tube. With round tubes, on the one hand, the recess offers a flat installation surface for the strain sensor and, on the other, due to the reduced thickness of the tube wall, enables optimum dimensioning of the bending joint without this necessitating the fillet groove to be formed too deep and hence also too wide.

In order to avoid unnecessary material stresses in the region between the bending joints and for a more flexible design of the bending joints on the deflection of the measuring diaphragm, a slit extending centrally between them toward the measuring diaphragm can be provided, which extends into the measuring diaphragm from the circumferential side of the tube to a part. This causes the bending joint to be extended into the slit so that at least one further strain sensor can be arranged therein opposite the fillet groove. The further strain sensor is arranged at the start of the slit close to the circumferential side of the tube. As a result, it is not difficult to install in the slit.

To ensure that the bending joint with an extended length into the slot has the same bending properties, at least where the strain sensors are arranged, the width of the slit is preferably dimensioned such that the material thickness between the fillet groove and the strain sensor on the circumferential side of the tube and between the fillet groove and the in the slit is at least approximately the same. Then both strain sensors supply signals of approximately the same size and can, for example, for purposes of signal duplication be connected electrically in series.

In order, on the deflection of the measuring diaphragm, to concentrate deformation of the measuring diaphragm on its edge region at which the measuring diaphragm is connected via the bending joints to the strain sensors attached there with the tube, the measuring diaphragm can have a greater thickness in its central region around the opening than in its edge region. Alternatively, both sides of the measuring diaphragm can each contain a circumferential groove in a region between the tube and its opening. The outer region of the measuring diaphragm between the circumferential grooves and fillet grooves then functions as a double bending bar.

The through-flow measurement arrangement in accordance with the invention can be easily adapted to different measuring tasks in that a restrictor is inserted into the opening of the measuring diaphragm as a replaceable part. The restrictor can be, for example, a diaphragm insert, a nozzle or a Venturi tube.

The through-flow measurement arrangement in accordance with the invention, which can be produced with high and reproducible precision, is accordingly robust. As a result, it is particularly suitable for use as a measuring cell or sensor in a measuring transducer for process instrumentation.

BRIEF DESCRIPTION OF THE DRAWINGS

The invention, embodiments, and advantages will be described below in more detail with reference to the drawings that depict an exemplary embodiment of the invention, in which.

DETAILED DESCRIPTION OF THE EXEMPLARY EMBODIMENTS

In the figures, the same parts are given the same reference numbers.

Figure 1:
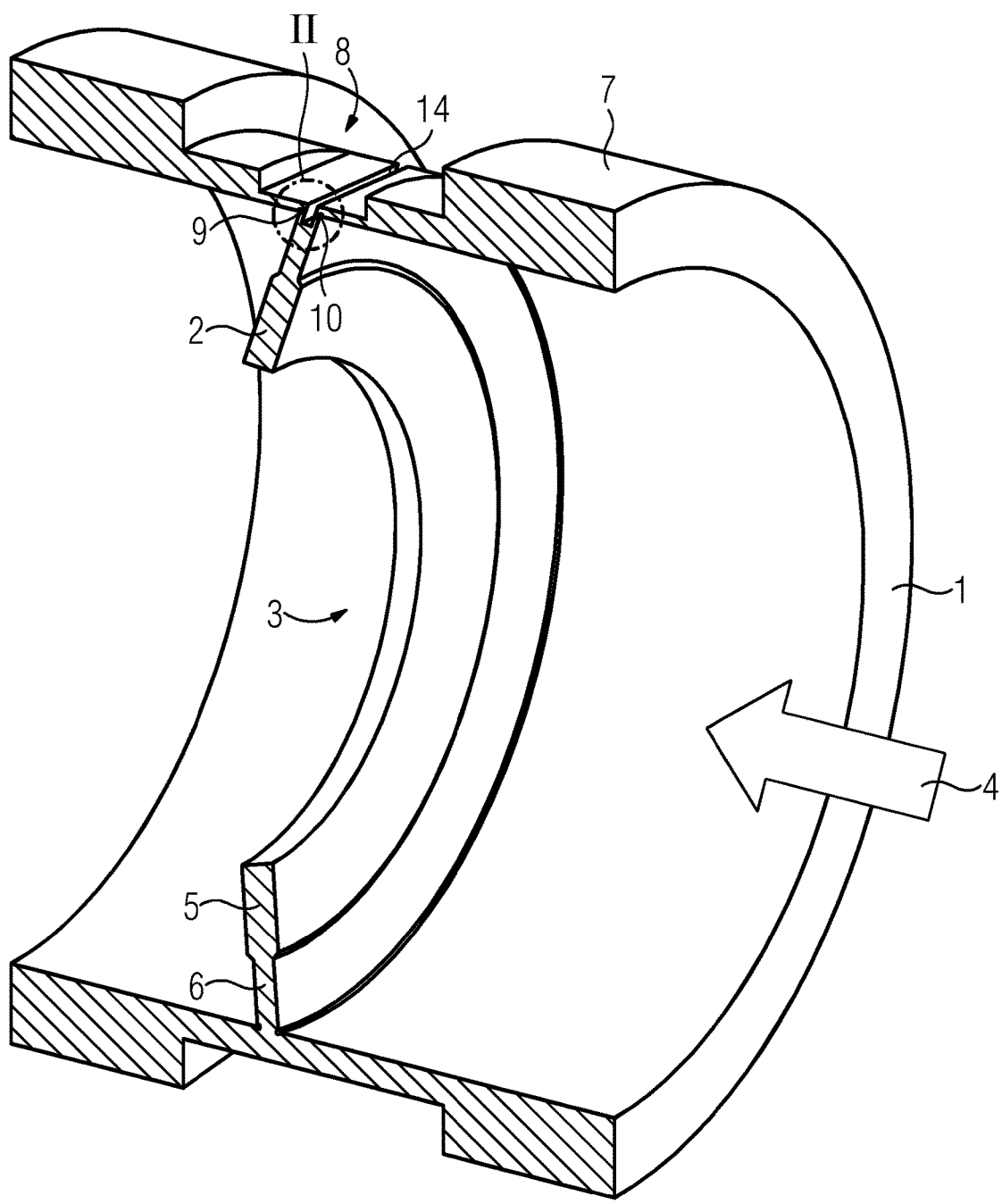
FIG. 1 is a sectional view of a through-flow measurement arrangement in accordance with the invention.

FIG. 1 shows a longitudinal section through a tube 1 in which an elastically deformable measuring diaphragm 2 (or orifice plate) is arranged in its cross section. The measuring diaphragm 2 and the tube 1 are formed in one piece from a uniform material, such as steel. In its center, the measuring diaphragm 2 comprises a diaphragm opening 3 via which the cross section of the tube is constricted for a flowing medium 4. Therefore, the flowing medium 4 causes a pressure drop over the measuring diaphragm 2 so that it becomes deformed and deflected. In the example shown, in its central region 5 around its opening 3, the measuring diaphragm 2 has a greater thickness than in its outer region 6, by which it is connected to the tube 1. The tube 1 contains on its circumferential side 7, in a region opposite the measuring diaphragm 2, a recess 8. As a result, the wall thickness of the tube 1 is reduced on both sides of the measuring diaphragm 2.

Figure 2:
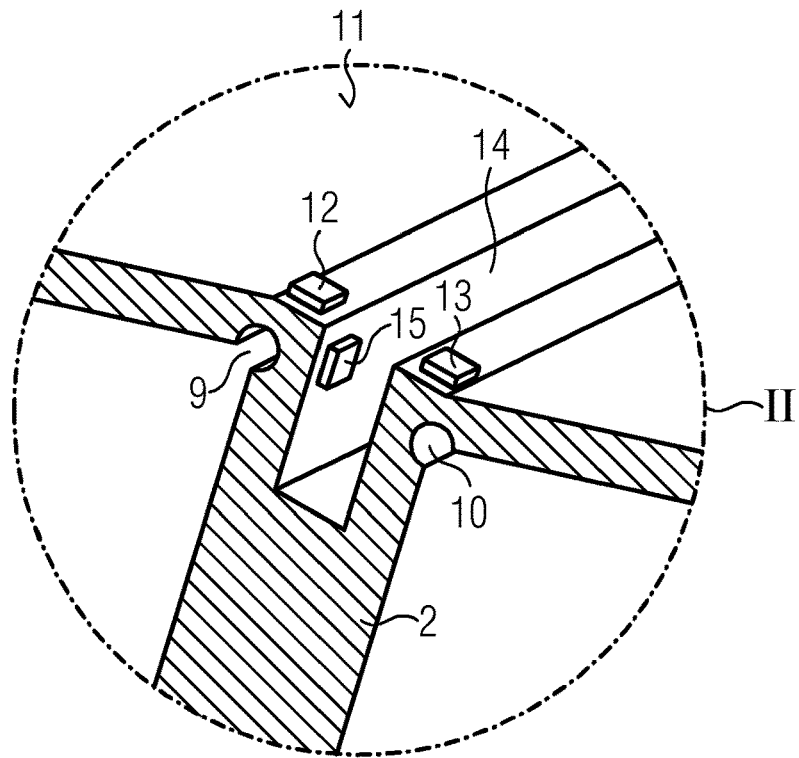
FIG. 2 is a view of an enlarged section of the through-flow measurement arrangement of FIG. 1.

FIG. 2 shows the detail II from FIG. 1. In the location where the measuring diaphragm 2 meets the tube 1 in a T-shape and passes thereinto, in each case a fillet groove 9, 10 is incorporated into the wall of the tube 1 on both sides of the measuring diaphragm 2 and, as shown here, preferably but not mandatorily also into the measuring diaphragm 2. The wall of the tube 1 in the regions between the fillet grooves 9, 10 and the circumferential side 7 of the tube 1, here formed by the base area 11 of the recess 8, in each case a solid bending joint. The deformation of the bending joints on deflection of the measuring diaphragm 2 is detected with the aid of strain sensors 12, 13 arranged in the recess 8 on the circumferential side 7 of the tube 1 opposite the fillet groove 9, 10. Therefore, the base area 11 of the recess 8 is formed flat at this point. If the strain sensor 12 detects a stretching-type of deformation, the strain sensor 13 simultaneously measures compressive deformation, and vice versa.

Between the bending joints, a slit 14 extending centrally to the measuring diaphragm 2 extends into the measuring diaphragm 2 from the circumferential side 7 of the tube 1 to a part. The width of the slit 14 can be dimensioned such that the material thickness between the fillet groove 9, 10 and the opposite circumferential side 7 (base area 11) of the tube 1 is exactly the same as it is between the fillet groove 9, 10 and the opposite wall of the slit 14. The slit 14 causes an extension of the bending joints into the slit 14 in which further strain sensors, e.g. 15 can be arranged opposite the fillet groove 9, 10. The strain sensors 12 and 15 then supply signals of approximately the same size and can, for example, for purposes of signal duplication, be connected electrically in series.

The arrangement of the strain sensors 12, 13, 15 according to the detail II shown in FIG. 2 can be repeated over the circumference of the tube 1 preferably at equidistant intervals.

Returning to FIG. 1, instead of the change of thickness between the central region 5 and the outer region 6 on both sides, the measuring diaphragm 2 can in each case contain a circumferential groove, which is not shown here. The outer region 6 of the measuring diaphragm between the circumferential groove and the fillet grooves 9, 10 then functions as a double bending bar.

Figure 3:
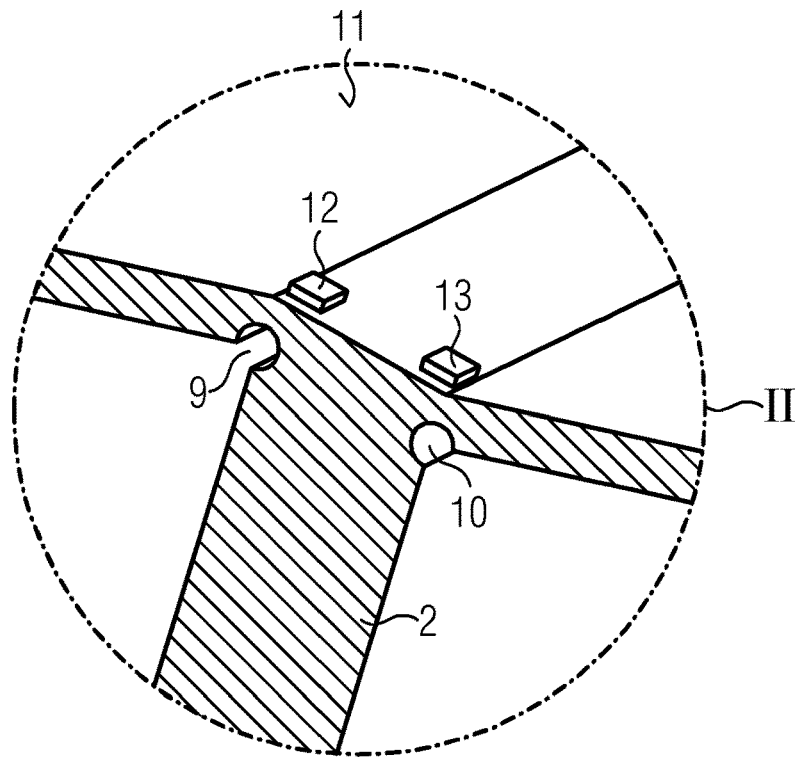
FIG. 3 is a view of an alternative embodiment of the example in FIG. 2 of the through-flow measurement arrangement.

As FIG. 3 shows, with a simpler embodiment of the through-flow measurement arrangement in accordance with the invention, it is possible eliminate the slit 14.

Figure 4:
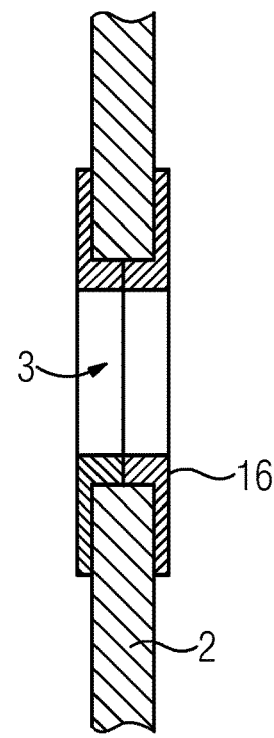
FIG. 4 is an illustration of an example of the use of a replaceable restrictor in the opening of the measuring diaphragm.

FIG. 4 shows a longitudinal section through the measuring diaphragm 2 in the region of the opening 3. In order to adapt the through-flow measurement arrangement to different measuring tasks, a restrictor 16, here in the form of a diaphragm insert, is inserted in the opening 3. The restrictor 16 is, for example, formed in two parts and is therefore simple to install and remove.

Figure 5:
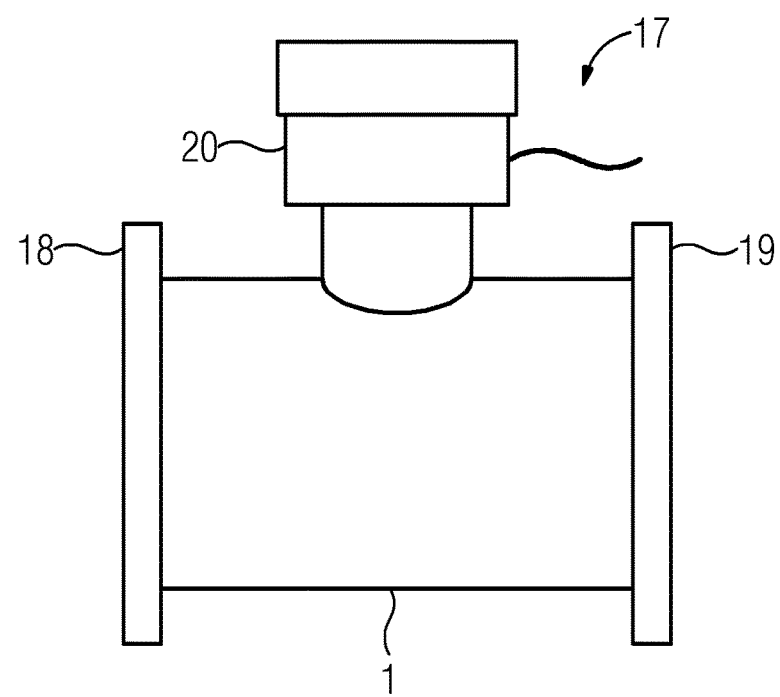
FIG. 5 is an illustration of an example of a measuring transducer with the through-flow measurement arrangement.

FIG. 5 shows a measuring transducer 17 for process instrumentation with the tube 1 containing the measuring diaphragm that is not visible here and provided with mounting flanges 18, 19 and a measuring head 20 containing the measuring electronics.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or structures which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A flow measurement arrangement which operates in accordance with a differential pressure method comprising:
   a tube;
   an elastically deformable orifice plate arranged in a cross section of the tube;
   at least one strain sensor which detects a deformation of the elastically deformable orifice plate and converts said deformation into an electric signal; and
   a slit extending centrally to the elastically deformable orifice plate and extending into the elastically deformable orifice plate from a circumferential side of the tube to a part;
   wherein the elastically deformable orifice plate and the tube are formed in one piece from a uniform material;
   wherein both sides of the elastically deformable orifice plate each merge into the tube via a fillet groove; and
   wherein the at least one strain sensor is arranged on a circumferential side of the tube opposite the fillet groove.

2. The flow measurement arrangement as claimed in claim 1, wherein the at least one strain sensor is arranged in a recess on the circumferential side of the tube.

3. The flow measurement arrangement as claimed in claim 1, wherein at least one further strain sensor is arranged in the slit opposite the fillet groove.

4. The flow measurement arrangement as claimed in claim 3, wherein a material thickness between the fillet groove and an opposite circumferential side of the tube and between the fillet groove and an opposite wall of the slit is at least approximately the same.

5. The flow measurement arrangement as claimed in claim 1, wherein a material thickness between the fillet groove and an opposite circumferential side of the tube and between the fillet groove and an opposite wall of the slit is at least approximately the same.

6. The flow measurement arrangement as claimed in claim 1, wherein a thickness of an edge region of the elastically deformable orifice plate is greater than a thickness of a central region around an orifice of the elastically deformable orifice plate.

7. The flow measurement arrangement as claimed in claim 1, wherein a restrictor is held in an orifice of the elastically deformable orifice plate as a replaceable part.

8. The flow measuring arrangement as claimed in claim 1, further comprising: a measuring head containing measuring electronics and forming a measuring transducer for process instrumentation.

* * * * *